United States Patent
Teng et al.

(10) Patent No.: US 10,129,748 B2
(45) Date of Patent: Nov. 13, 2018

(54) DEVICE AND METHOD FOR TRANSMITTING AND RECEIVING WI-FI PARAMETER

(71) Applicant: NANNING FUGUI PRECISION INDUSTRIAL CO., LTD., Nanning (CN)

(72) Inventors: Wei Teng, Shenzhen (CN); Chi-Ming Lu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/391,792

(22) Filed: Dec. 27, 2016

(65) Prior Publication Data

US 2018/0146372 A1    May 24, 2018

(30) Foreign Application Priority Data

Nov. 22, 2016    (CN) .......................... 2016 1 1036095

(51) Int. Cl.
| | |
|---|---|
| *H04L 29/06* | (2006.01) |
| *H04W 12/06* | (2009.01) |
| *H04L 9/06* | (2006.01) |
| *H04W 12/10* | (2009.01) |
| *H04W 84/12* | (2009.01) |

(52) U.S. Cl.
CPC .......... *H04W 12/06* (2013.01); *H04L 9/0643* (2013.01); *H04L 63/0435* (2013.01); *H04L 63/123* (2013.01); *H04W 12/10* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 4,420,694 A | * | 12/1983 | Yokota | ..................... H03G 3/34 307/130 |
| 5,038,402 A | | 8/1991 | Robbins | |
| 8,126,145 B1 | | 2/2012 | Tewari et al. | |
| 9,491,261 B1 | * | 11/2016 | Shagam | ................... H04L 67/40 |
| 2004/0101141 A1 | * | 5/2004 | Alve | ..................... G06F 21/602 380/278 |
| 2004/0221284 A1 | | 11/2004 | Costello et al. | |

(Continued)

FOREIGN PATENT DOCUMENTS

CN    104378801 A    2/2015

*Primary Examiner* — Benjamin E Lanier
(74) *Attorney, Agent, or Firm* — ScienBiziP, P.C.

(57) ABSTRACT

A WI-FI parameter transmitting device can transmit a WI-FI parameter in the form of a broadcast signal, and includes an encryption module, a configuration module, a modulation module, and a play module. The encryption module obtains and encrypts the WI-FI parameter and the configuration module configures an encrypted WI-FI parameter and authorization information to generate WI-FI configuration information. The modulation module modulates the WI-FI configuration information with a carrier signal to generate a PCM signal and the play module plays the PCM signal in at least one predetermined frequency. A WI-FI parameter transmitting method and a WI-FI parameter receiving device and method are further provided.

10 Claims, 7 Drawing Sheets

(56) References Cited

U.S. PATENT DOCUMENTS

| | | | |
|---|---|---|---|
| 2007/0188220 A1* | 8/2007 | Masuda | H03F 3/2173 330/10 |
| 2009/0003240 A1* | 1/2009 | Negron | H04L 12/2807 370/254 |
| 2014/0259047 A1* | 9/2014 | Bakar | H04N 21/6371 725/30 |
| 2015/0261415 A1 | 9/2015 | Lee et al. | |
| 2016/0164889 A1 | 6/2016 | Zhang | |
| 2017/0004836 A1* | 1/2017 | Jing | G10L 19/008 |

\* cited by examiner

DEVICE AND METHOD FOR TRANSMITTING AND RECEIVING WI-FI PARAMETER

FIELD

The subject matter herein generally relates to a device and method for transmitting and receiving WI-FI parameter.

BACKGROUND

Multiple network devices can be connected to a WI-FI access point (AP) to access internet. When an access parameter (such as an access password) of the WI-FI AP is changed, each of the network devices needs to reinstall a WI-FI access parameter to connect to the WI-FI AP.

BRIEF DESCRIPTION OF THE DRAWINGS

Implementations of the present technology will now be described, by way of example only, with reference to the attached figures.

DETAILED DESCRIPTION

Figure 1:
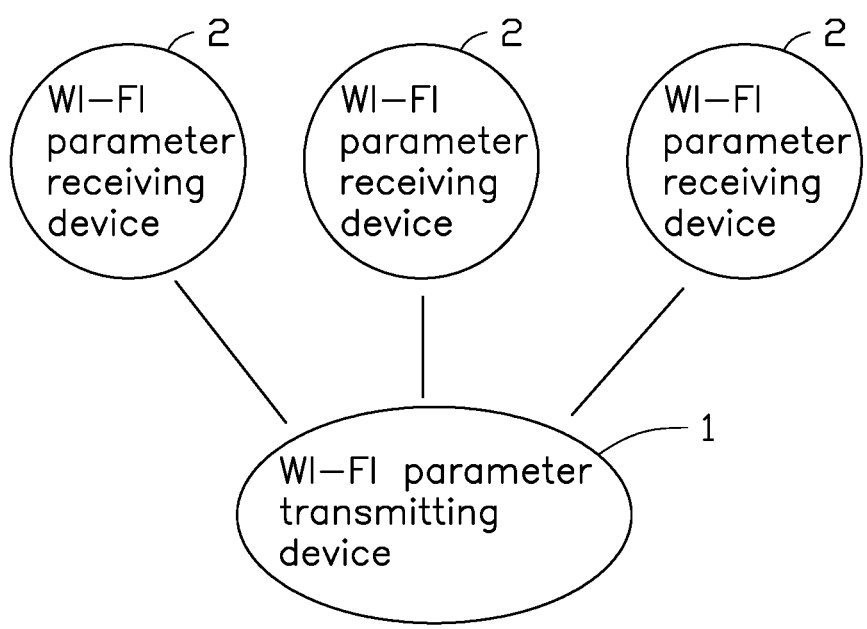
FIG. 1 is a diagram of an exemplary embodiment of a WI-FI parameter transmitting device and a WI-FI parameter receiving device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1-FIG. 5 illustrate a WI-FI parameter transmitting device 1 and a WI-FI parameter receiving device 2 in accordance with an exemplary embodiment.

Figure 2:
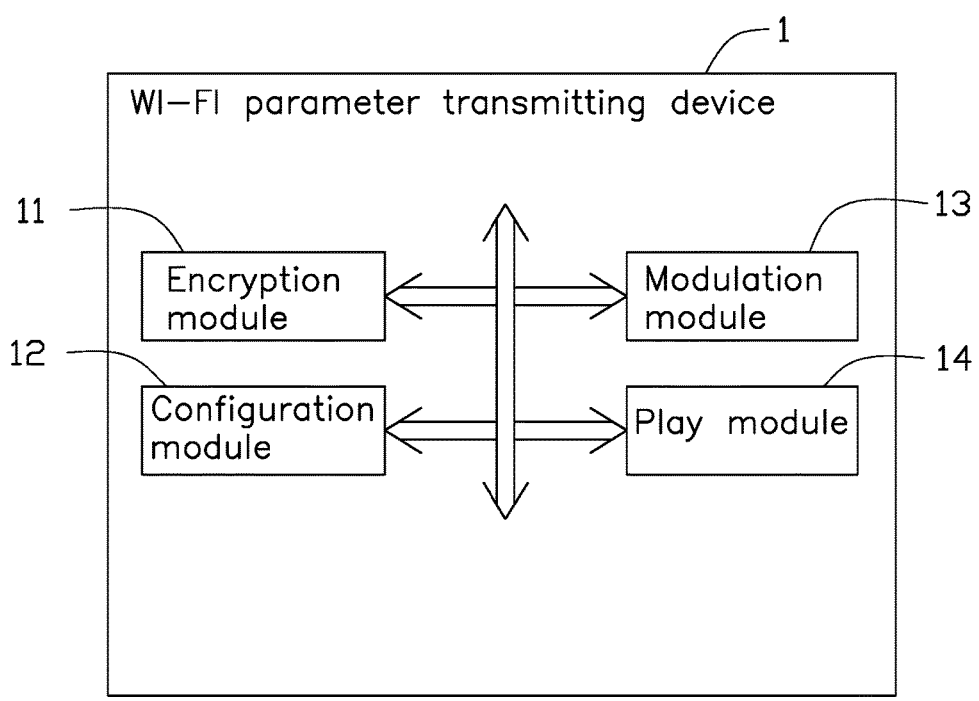
FIG. 2 is a block diagram of a first exemplary embodiment of the WI-FI parameter transmitting device of FIG. 1.

The WI-FI parameter transmitting device 1 is configured to transmit a WI-FI parameter in the form of a broadcast signal. In FIG. 2, the WI-FI parameter transmitting device 1 comprises an encryption module 11, a configuration module 12, a modulation module 13, and a play module 14.

The encryption module 11 is configured to obtain a WI-FI parameter and encrypt the WI-FI parameter. The configuration module 12 configures an encrypted WI-FI parameter and authorization information to generate WI-FI configuration information. The modulation module 13 is configured to modulate the WI-FI configuration information with a carrier signal to generate a PCM signal. The play module 14 is configured to play the PCM signal in at least one predetermined frequency.

Figure 3:
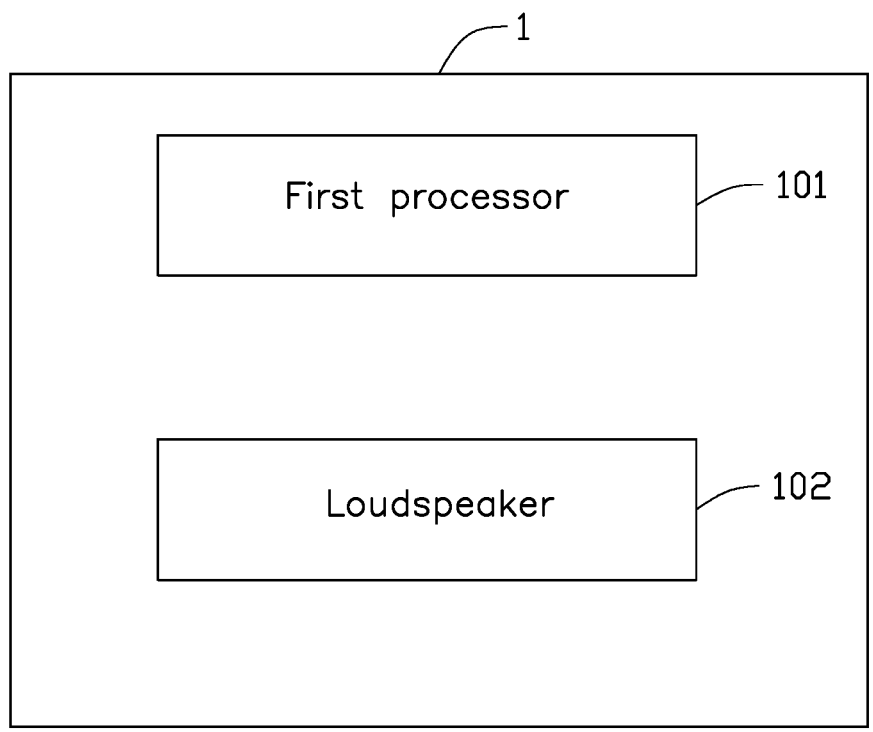
FIG. 3 is a block diagram of a second exemplary embodiment of the WI-FI parameter transmitting device of FIG. 1.

In one exemplary embodiment, the WI-FI parameter transmitting device 1 can be a wireless router or other equipment that can supply WI-FI access point (AP). The encryption module 11, the configuration module 12, and the modulation module 13 can be executed by at least one first processor 101 as shown in FIG. 3. The play module 14 can be a loudspeaker 102.

In one exemplary embodiment, the authorization information can be administrator identification information. The encryption module 11 can encrypt the WI-FI parameter according to a symmetrical encryption algorithm.

The WI-FI configuration information is a binary data frame. The WI-FI configuration information can comprise a synchronization byte, a length byte, a first data byte, a second data byte, and a third data byte. The synchronization byte is configured to indicate a start position of the binary data frame. The length byte is configured to indicate a length of the binary data frame. The first data byte is configured to house the authorization information. The second data byte is configured to house the WI-FI parameter. The third data byte is configured to house a hash value.

Figure 4:
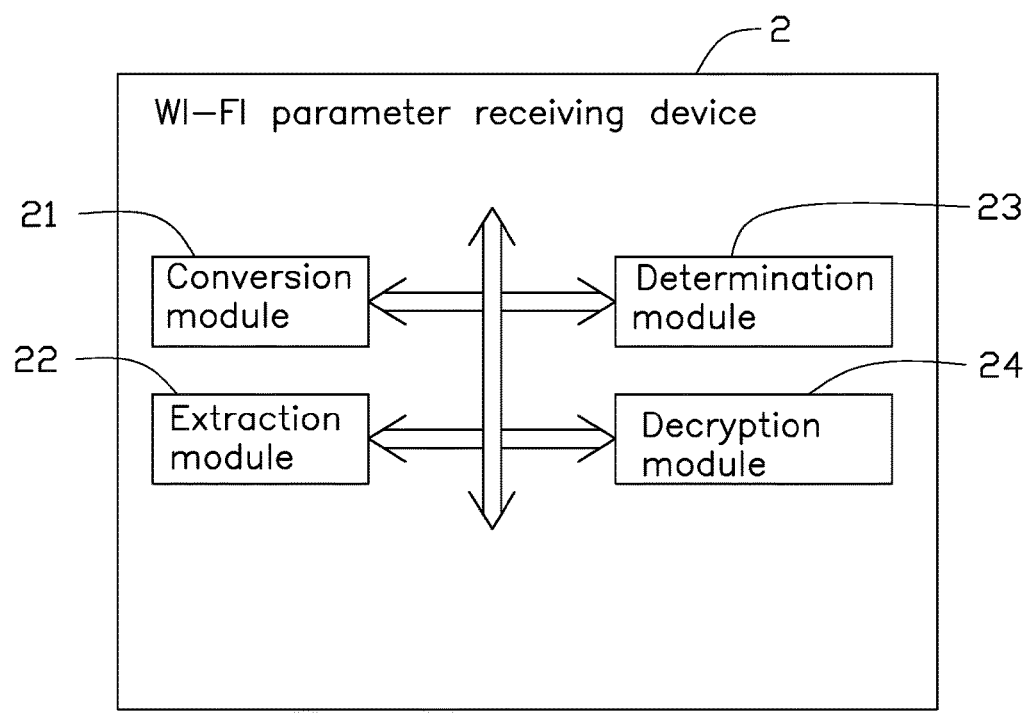
FIG. 4 is a block diagram of a first exemplary embodiment of the WI-FI parameter receiving device of FIG. 1.
Figure 5:
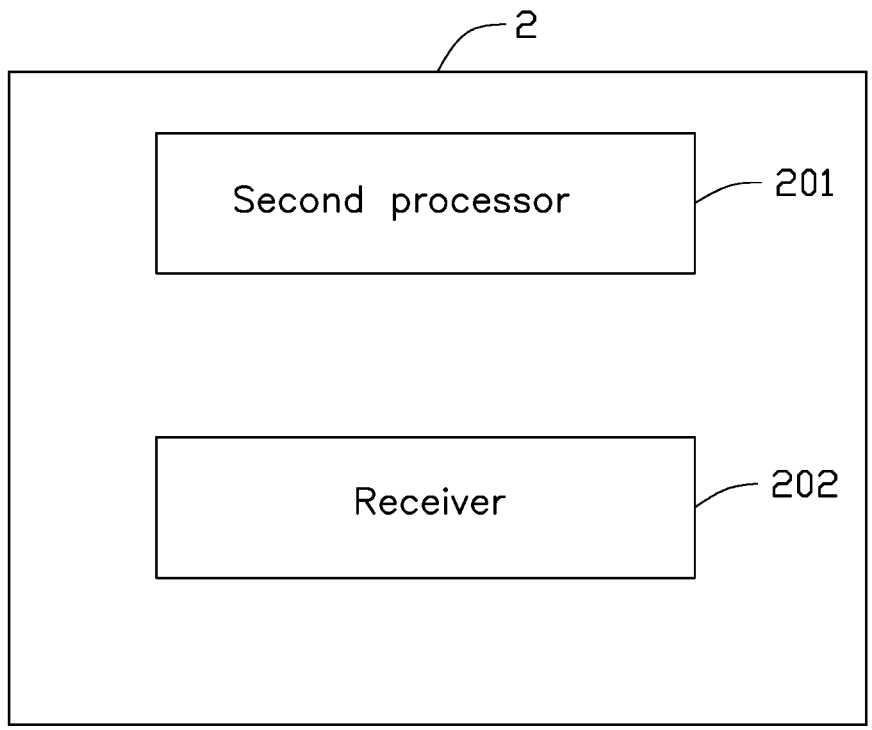
FIG. 5 is a block diagram of a second exemplary embodiment of the WI-FI parameter receiving device of FIG. 1.

In one exemplary embodiment, the synchronization byte can occupy two bytes of data. For example, the two bytes of the synchronization byte can be 0x55 0xBB. When the WI-FI parameter receiving device 2 receives a broadcast signal and converts the broadcast signal to a PCM signal as shown in FIG. 4, the WI-FI parameter receiving device 2 can determine whether the PCM signal comprises the WI-FI configuration information according to 0x55 0xBB. The length byte can occupy two bytes of data. The first data byte can occupy four bytes of data. The WI-FI parameter can occupy N bytes of data. The hash value can occupy M bytes of data. The WI-FI parameter receiving device 2 can extract the WI-FI parameter and the hash value according to a byte distribution of the WI-FI configuration information.

In one exemplary embodiment, the hash value can be calculated according to the length byte, the first data byte, the second data byte, and a hash key. The hash key can be set by an administrator.

In one exemplary embodiment, the carrier signal can be a sinusoidal signal that has fixed frequency and fixed amplitude. The first binary data sequence is a first PCM data that samples the carrier signal in a predetermined time and the second binary data sequence is a second PCM data that samples a muting signal in the predetermined time. The predetermined time can be one second. For example, if a number of a sampling bit is eight bits, the first binary data sequence can be 0x00 0x3F 0xF0 0xF0 0x3F 0x00 0x3F 0xF0, and the second binary data sequence can be 0x00 0x00 0x00 0x00 0x00 0x00 0x00 0x00.

In FIG. 2, when the modulation module 13 starts modulating, the modulation module 13 opens an empty binary file to save the first binary data sequence and the second binary data sequence. The modulation module 13 reads one bit of data of the WI-FI configuration information every time and can determine whether the bit of data is the first data or the second data. The first data is binary 1 and the second data is binary 0.

When the bit of data is the first data, the modulation module 13 writes the first binary data sequence into the empty binary file. When the bit of data is the second data, the modulation module 13 writes the second binary data sequence into the empty binary file. After reading of the WI-FI configuration information, the modulation module 13 closes the empty binary file to generate the PCM signal.

In one exemplary embodiment, the play module 14 alternatively plays the PCM signal in a first frequency and a second frequency.

The WI-FI parameter receiving device 2 is configured to receive the broadcast signal played through the WI-FI parameter transmitting device 1 and extract the WI-FI parameter.

In one exemplary embodiment, the WI-FI parameter receiving device 2 can be a mobile phone, a computer, or a network television.

In FIG. 4, the WI-FI parameter receiving device 2 comprises a conversion module 21, an extraction module 22, a determination module 23, and a decryption module 24. The conversion module 21 is configured to receive the broadcast signal and convert the broadcast signal to the PCM signal. The extraction module 22 is configured to determine whether the PCM signal comprises the WI-FI configuration information. If the PCM signal does comprise the WI-FI configuration information, the WI-FI configuration information is extracted from the PCM signal. The determination module 23 is configured to determine whether the WI-FI configuration information is authorized. If the WI-FI configuration information is authorized, the decryption module 24 is configured to decrypt the WI-FI configuration information to obtain the WI-FI parameter. The WI-FI parameter receiving device 2 can update a network configuration according to the WI-FI parameter.

In one exemplary embodiment, the conversion module 21, the extraction module 22, the determination module 23, and the decryption module 24 can be executed by at least one second processor 201 and a receiver 202. The receiver 202 can be used to receive the broadcast signal.

In one exemplary embodiment, the conversion module 21 receives the broadcast signal in the first frequency or in the second frequency or both. The conversion module 21 is configured to select a better broadcast frequency, "better" meaning less noise as between the first frequency and the second frequency. The conversion module 21 converts the broadcast signal of the better broadcast frequency to the PCM signal. For example, when the first frequency is the better broadcast frequency, the conversion module 21 converts the broadcast signal of the first frequency to the PCM signal.

When the extraction module 22 starts exacting, the extraction module 22 opens a binary cache area and clears the binary cache area. The extraction module 22 reads a predetermined byte of the PCM signal every time. When the number of the sampling bit is eight bits, the extraction module 22 reads eight bytes of the PCM signal every time.

The extraction module 22 calculates a sum of the eight bytes. When the sum is greater than a reference value, the extraction module 22 writes the first data into the binary cache area. When the sum is not greater than the reference value, the extraction module 22 writes the second data into the binary cache area. After the reading of the PCM signal is finished, the extraction module 22 closes the binary cache area to generate the WI-FI configuration information.

In one exemplary embodiment, the reference value can be set according to an attenuation of the broadcast signal and the first binary data sequence.

In one exemplary embodiment, the determination module 23 is further configured to extract the authorization information from the WI-FI configuration information. The determination module 23 also verifies the authorization information to determine whether the WI-FI configuration information is authorized. When the WI-FI configuration information is authorized, decryption of the WI-FI configuration information will continue. When the WI-FI configuration information is not authorized, the WI-FI configuration information will not be processed.

In one exemplary embodiment, when the WI-FI configuration information is authorized, the decryption module 24 is further configured to extract the hash value from the WI-FI configuration information. The WI-FI parameter receiving device 2 further recalculates a hash value according to the extracted WI-FI configuration information. The decryption module 24 compares the extracted hash value with the recalculated hash value to determine whether the WI-FI configuration information is transmitted by the WI-FI parameter transmitting device 1.

When the extracted hash value is equal to the recalculated hash value, the decryption module 24 decrypts the WI-FI configuration information to obtain the WI-FI parameter. When the extracted hash value is not equal to the recalculated hash value, the WI-FI configuration information will not be processed by the decryption module 24.

In one exemplary embodiment, the decryption module 24 can decrypt the WI-FI configuration information through a symmetric algorithm.

Figure 6:
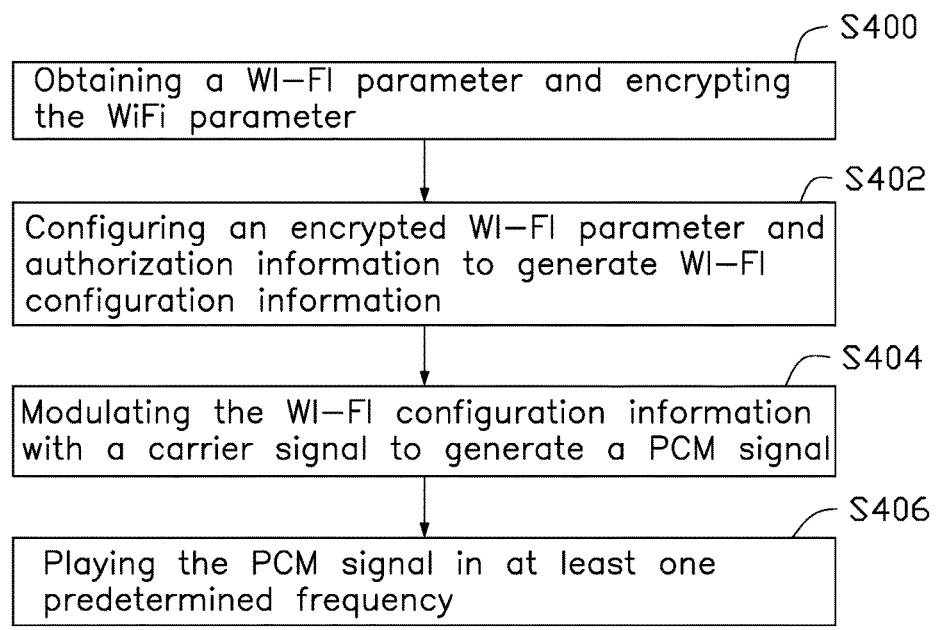
FIG. 6 is a flow diagram of an exemplary embodiment of a WI-FI parameter transmitting method.

FIG. 6 illustrates an exemplary embodiment of a WI-FI parameter transmitting method. The flowchart presents an example exemplary embodiment of the method. The example method is provided by way of example, as there are a variety of ways to carry out the method. The method described below can be carried out using the configurations illustrated in FIG. 2, for example, and various elements of these figures are referenced in explaining the example method. Each step shown in FIG. 6 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S400.

In step S400, the encryption module 11 obtains the WI-FI parameter and encrypt the WI-FI parameter.

In step S402, the configuration module 12 configures the encrypted WI-FI parameter and the authorization information to generate the WI-FI configuration information.

In step S404, the modulation module 13 modulates the WI-FI configuration information with the carrier signal to generate the PCM signal.

In step S406, the play module 14 plays the PCM signal in the at least one predetermined frequency.

In one exemplary embodiment, the encryption module 11 can encrypt the WI-FI parameter according to the symmetric encryption algorithm.

In one exemplary embodiment, the configuration module 12 can calculate the hash value according to the length byte, the encrypted WI-FI parameter, the hash key, and the authorization information. The configuration module 12 further generate the WI-FI configuration information according to the synchronization byte, the length byte, the encrypted WI-FI parameter, the authorization information, and the hash value.

In one exemplary embodiment, the modulation module 13 opens the empty binary file to save the first binary data sequence and the second binary data sequence. The modulation module 13 reads one bit of data of the WI-FI configuration information every time and determines the bit of data is the first data or the second data. When the bit data is the first data, the modulation module 13 writes the first binary data sequence into the empty binary file. When the bit data is the second data, the modulation module 13 writes the second binary data sequence into the empty binary file. After reading of the WI-FI configuration information, the modulation module 13 closes the empty binary file to generate the PCM signal.

Figure 7:
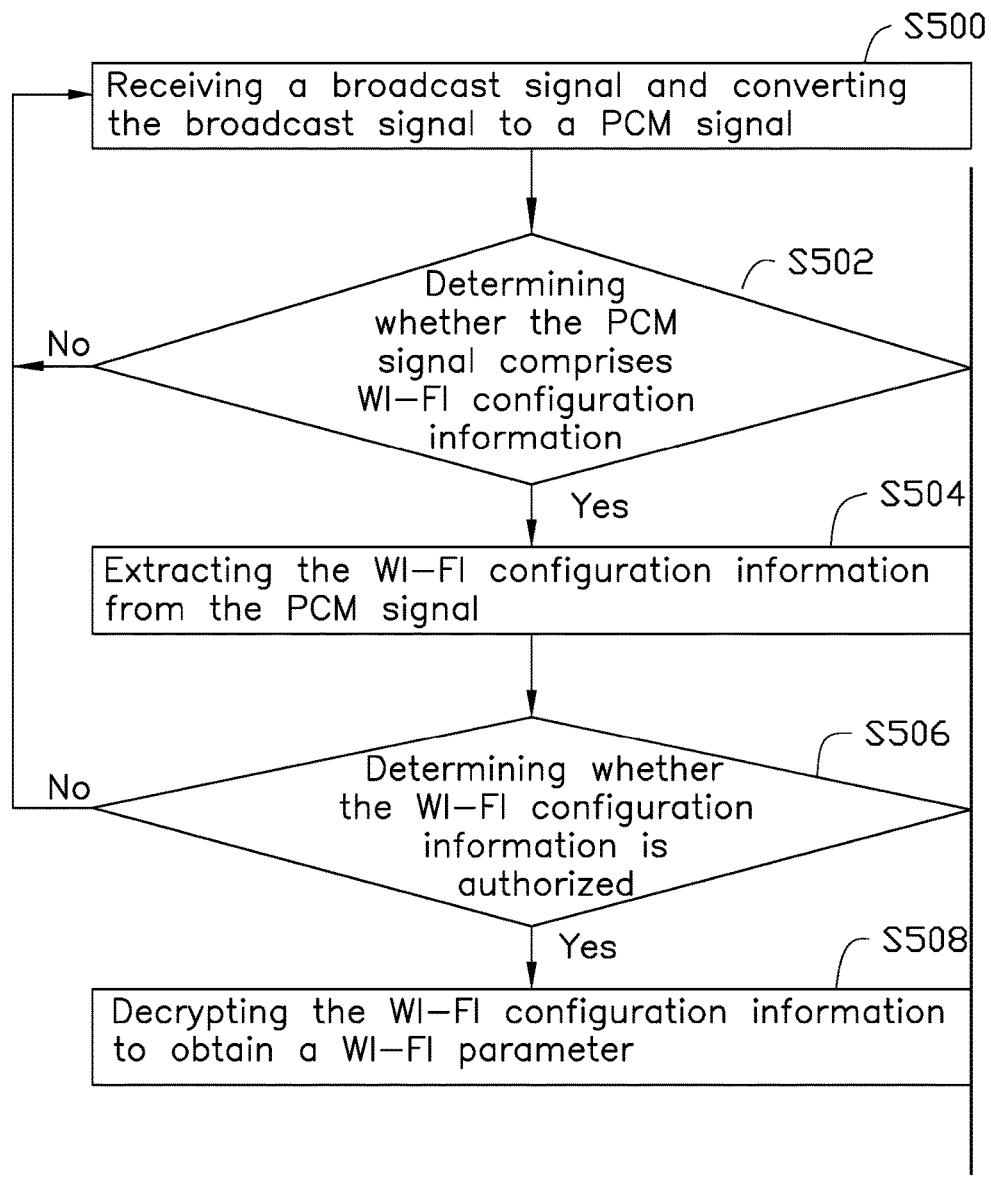
FIG. 7 is a flow diagram of an exemplary embodiment of a WI-FI parameter receiving method.

FIG. 7 illustrates an exemplary embodiment of a WI-FI parameter receiving method. The flowchart presents an exemplary embodiment of the method. The example method is provided by way of example, as there are a variety of ways to carry out the method. The method described below can be carried out using the configurations illustrated in FIG. 4, for example, and various elements of these figures are referenced in explaining the example method. Each step shown in FIG. 7 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S500.

In step S500, the conversion module 21 receives the broadcast signal and converts the broadcast signal to the PCM signal.

In step S502, the extraction module 22 determines whether the PCM signal comprises the WI-FI configuration information.

In step S504, the extraction module 22 extracts the WI-FI configuration information from the PCM signal in response to the PCM signal comprising the WI-FI configuration information. if the PCM signal does not comprise the WI-FI configuration information, the process turns to step S500.

In step S506, the determination module 23 determines whether the WI-FI configuration information is authorized.

In step S508, the decryption module 24 decrypts the WI-FI configuration information to obtain the WI-FI parameter in response to the WI-FI configuration information being authorized. If the WI-FI configuration information is not authorized, the process turns to step S500.

In one exemplary embodiment, the conversion module 21 can receive the broadcast signal in the first frequency or in the second frequency or both. The conversion module 21 selects the better broadcast frequency comprising less noise between the first frequency and the second frequency. The conversion module 21 converts the broadcast signal of the better broadcast frequency to the PCM signal.

In one exemplary embodiment, the extraction module 22 can detect 0x55 0xBB to determine whether the PCM signal comprises the WI-FI configuration information.

In one exemplary embodiment, the extraction module 22 opens the binary cache area and clear the binary cache area. The extraction module 22 reads eight bytes of the PCM signal every time. The extraction module 22 calculates the sum of the eight bytes. When the sum is greater than the reference value, the extraction module 22 writes the first data into the binary cache area. When the sum is not greater than the reference value, the extraction module 22 writes the second data into the binary cache area. After reading of the PCM signal, the extraction module 22 closes the binary cache area to generate the WI-FI configuration information. The first data is a binary digit 1 and the second data is binary digit 0.

In one exemplary embodiment, the determination module 23 extracts the authorization information from the WI-FI configuration information. The determination module 23 verifies the authorization information to determine whether the WI-FI configuration information is authorized. When the WI-FI configuration information is authorized, decryption of the WI-FI configuration information will continue. When the WI-FI configuration information is not authorized, the WI-FI configuration information will not be processed.

In one exemplary embodiment, when the WI-FI configuration information is authorized, the decryption module 24 extracts the hash value from the WI-FI configuration information. The WI-FI parameter receiving device 2 recalculates a hash value according to the extracted WI-FI configuration information. The decryption module 24 compares the extracted hash value with the recalculated hash value to determine whether the WI-FI configuration information is transmitted by the WI-FI parameter transmitting device 1.

When the extracted hash value is equal to the recalculated hash value, the decryption module 24 decrypts the WI-FI configuration information to obtain the WI-FI parameter. When the extracted hash value is not equal to the recalculated hash value, the WI-FI configuration information will not be processed by the decryption module 24. The decryption module 24 can decrypt the WI-FI configuration information through the symmetric algorithm.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A WI-FI parameter receiving method comprising:
    receiving a broadcast signal and converting the broadcast signal to a PCM signal;
    determining whether the PCM signal comprises WI-FI configuration information;
    extracting the WI-FI configuration information from the PCM signal in response to the PCM signal comprising the WI-FI configuration information;
    determining whether the WI-FI configuration information is authorized;
    decrypting the WI-FI configuration information to obtain a WI-FI parameter in response to the WI-FI configuration information being authorized;

wherein extracting the WI-FI configuration information from the PCM signal comprises:
reading a predetermined byte of the PCM signal;
calculating a sum of the predetermined byte of the PCM signal;
determining whether the sum is greater than a reference value;
writing a first data into the WI-FI configuration information in response to the sum being greater than the reference value; and;
writing a second data into the WI-FI configuration information in response to the sum being less than the reference value.

2. The WI-FI parameter receiving method of claim 1, wherein receiving a broadcast signal and converting the broadcast signal to a PCM signal comprises:
receiving a broadcast signal in a first frequency and a second frequency; and
selecting a better broadcast frequency, the better broadcast frequency comprising the frequency having less noise between the first frequency and the second frequency; and
converting the broadcast signal of the better broadcast frequency to a PCM signal.

3. The WI-FI parameter receiving method of claim 1, wherein determining whether the WI-FI configuration information is authorized comprises:
extracting authorization information from the WI-FI configuration information; and
verifying the authorization information to determining whether the WI-FI configuration information is authorized.

4. The WI-FI parameter receiving method of claim 1, wherein decrypting the WI-FI configuration information to obtain a WI-FI parameter in response to the WI-FI configuration information being authorized comprises:
extracting a hash value from the WI-FI configuration information in response to the WI-FI configuration information being authorized;
comparing the hash value with a recalculated hash value; and
decrypting the WI-FI configuration information to obtain a WI-FI parameter in response to the hash value being equal to the recalculated hash value.

5. The WI-FI parameter receiving method of claim 4, wherein decrypting the WI-FI configuration information to obtain a WI-FI parameter in response to the hash value being equal to the predetermined hash value comprises:
decrypting the WI-FI configuration information through a symmetric algorithm to obtain a WI-FI parameter in response to the hash value being equal to the recalculated hash value.

6. A WI-FI parameter receiving device comprising:
a receiver, configured to receive a broadcast signal; and
a processor comprising:
a conversion module, configured to convert the broadcast signal to a PCM signal;
an extraction module, configured to determine whether the PCM signal comprises WI-FI configuration information, and extract the WI-FI configuration information from the PCM signal in response to the PCM signal comprising the WI-FI configuration information, wherein the extraction module is further configured to read a predetermined byte of the PCM signal every time and calculate a sum of the predetermined byte, write a first data into the WI-FI configuration information in response to the sum being greater than a reference value and write a second data into the WI-FI configuration information in response to the sum being less than the reference value;
a determination module, configured to determine whether the WI-FI configuration information is authorized; and
a decryption module, configured to decrypt the WI-FI configuration information to obtain a WI-FI parameter in response to the WI-FI configuration information being authorized.

7. The WI-FI parameter receiving device of claim 6, wherein the receiver further respectively receives the broadcast signal in a first frequency and a second frequency; the conversion module is configured to select a better broadcast frequency and convert the broadcast signal of the better broadcast frequency to the PCM signal; and the better broadcast frequency comprises the frequency having less noise between the first frequency and the second frequency.

8. The WI-FI parameter receiving device of claim 6, wherein the determination module is further configured to extract authorization information from the WI-FI configuration information and verify the authorization information to determining whether the WI-FI configuration information is authorized.

9. The WI-FI parameter receiving device of claim 6, wherein the decryption module is further configured to extract a hash value from the WI-FI configuration information in response to the WI-FI configuration information being authorized, compare the hash value with a recalculated hash value, and decrypt the WI-FI configuration information to obtain the WI-FI parameter in response to the hash value being equal to the recalculated hash value.

10. The WI-FI parameter receiving device of claim 9, wherein the decryption module is further configured to decrypt the WI-FI configuration information through a symmetric algorithm.

* * * * *